(12) United States Patent
Sturov

(10) Patent No.: US 8,001,533 B2
(45) Date of Patent: Aug. 16, 2011

(54) MAINTAINING OBJECT REFERENTIAL INTEGRITY FOR ABSTRACT OBJECTS

(75) Inventor: Gleb Sturov, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1682 days.

(21) Appl. No.: 11/267,237

(22) Filed: Nov. 4, 2005

(65) Prior Publication Data
US 2007/0168938 A1    Jul. 19, 2007

(51) Int. Cl.
G06F 9/44 (2006.01)
G06F 9/45 (2006.01)
(52) U.S. Cl. .............. 717/126; 717/120; 717/144
(58) Field of Classification Search .......... None
See application file for complete search history.

(56) References Cited

U.S. PATENT DOCUMENTS

| | | | |
|---|---|---|---|
| 6,405,360 B1 | 6/2002 | Bohrer et al. | |
| 6,418,482 B1 | 7/2002 | Brodsky et al. | |
| 6,502,112 B1 | 12/2002 | Baisley | |
| 6,519,626 B1 | 2/2003 | Soderberg et al. | |
| 6,550,057 B1 * | 4/2003 | Bowman-Amuah | 717/126 |
| 6,694,333 B2 | 2/2004 | Oldham | |
| 6,718,516 B1 * | 4/2004 | Claussen et al. | 715/234 |
| 7,426,721 B1 * | 9/2008 | Saulpaugh et al. | 717/144 |
| 7,735,062 B2 * | 6/2010 | de Seabra e Melo et al. | 717/120 |
| 2002/0120612 A1 | 8/2002 | Ichihara | |
| 2004/0024848 A1 * | 2/2004 | Smith et al. | 709/219 |
| 2004/0088305 A1 | 5/2004 | Kintzley et al. | |
| 2004/0199486 A1 | 10/2004 | Gopinath et al. | |
| 2004/0210556 A1 * | 10/2004 | Brooke et al. | 707/1 |
| 2005/0097522 A1 * | 5/2005 | Backhouse et al. | 717/136 |
| 2007/0074169 A1 * | 3/2007 | Chess et al. | 717/126 |

OTHER PUBLICATIONS

"Efficient and transparent dynamic content updates for mobile clients", Armstrong et al., Jun. 2006, pp. 56-68, <http://delivery.acm.org/10.1145/1140000/1134687/p56-armstrong.pdf>.*

"B-tree concurrency control and recovery in page-server database systems", Jaluta et al., Mar. 2006, pp. 82-132, <http://delivery.acm.org/10.1145/1140000/1132866/p82-jaluta.pdf>.*

* cited by examiner

*Primary Examiner* — Thuy Dao
(74) *Attorney, Agent, or Firm* — Steven M. Greenberg, Esq.; Carey, Rodriguez, Greenberg & Paul

(57) ABSTRACT

A method, system and computer program product for maintaining object referential integrity for abstract objects. In a method of the invention, the method can include extracting a reference to an abstract object hierarchy from an address disposed in markup, locating branches of nodes in the abstract object hierarchy which define a concrete object, and translating each located branch of nodes to an address for the concrete object. Notably, extracting a reference to an abstract object hierarchy from an address disposed in markup, can include extracting a reference to an abstract object hierarchy from a URL disposed in a Web page. Finally, the method can include changing a property of each node in the abstract object hierarchy that matches a specified class identifier.

12 Claims, 2 Drawing Sheets

MAINTAINING OBJECT REFERENTIAL INTEGRITY FOR ABSTRACT OBJECTS

BACKGROUND OF THE INVENTION

1. Field of the Invention

The present invention relates to the field of object referential integrity and more particularly to maintaining object referential integrity for object references for abstract objects.

2. Description of the Related Art

Objects within the context of network computing refer to resources which can be accessed and utilized within a host computing device. Generally, objects can range from documents, such as Web pages, to image files and even programmatic logic. Objects often are referenced by name and include a location within memory or within a file system, either explicitly or implicitly. In the explicit circumstance, a network location can be specified—which also can be limited to a single host computing device not communicatively connected to other computing devices—and a path to the object also can be specified, for instance a file path. In the implicit circumstance, the network location, file system path, or both can be assumed by the context of the reference and only the identifying name of the referenced object is specified.

Object references often are encountered in the Internet and Intranet context where markup language documents reference one or more objects from within the document. Generally, objects can be referenced by way of a network address such as a URL. The format for addressing an object by a uniform resource locator (URL) can include protocol://[network-location]:[port]/[file-system-location]/[object-name]

where occasionally any of the port, file system location, and protocol can be presumed. Addressing an object by network address has proven to be highly effective when used in conjunction with concrete and seldom changing objects.

In the modern world of distributed computing, however, it is more often the case where an object changes either in respect to network location or file system location. To address the problem of oft-changing object references, methodologies have been proposed to preserve referential integrity of objects within Web sites. For example, see United States Patent Application Publication No. US 2004/0024848 A1 by Smith et al. Common solutions for referential integrity rely upon database tables listing referenced objects with valid locations. In this way, an accurate and valid reference for an object can be acquired through a quick lookup in the database.

As before, though, object references can be adequately managed using the database approach only so long as the objects are concrete in nature. Abstract objects, however, often do not enjoy directly addressable concrete properties such as an identifier and location. Object relationships, for example, nested object hierarchies, are abstract in nature. For instance, one referenced object can depend on the presence of one or more other object references and so forth.

To address object referential integrity for abstract objects, many have reverted to a proprietary object reference format which incorporates the object hierarchy in a single network address. For anything more than a single dependency, though, the formatting can become clunky and the solution, in its entirety, lacks extensibility. Also, proprietary formatting can fail where an address for a dependent object in the hierarchy changes. In the latter circumstance, the object hierarchy is not updateable and the logic processing the proprietary addressing must know to change each reference to the dependent object.

BRIEF SUMMARY OF THE INVENTION

Embodiments of the present invention address deficiencies of the art in respect to object referential integrity and provide a novel and non-obvious method, system and computer program product for maintaining object referential integrity for abstract objects. In one embodiment of the invention, a data processing system configured for managing referential integrity for abstract objects can include a content server coupled to a content repository and configured to provide requested pages to requesting content browsers over a computer communications network. The data processing system further can include a referential object integrity processor coupled to the content server.

The referential object integrity processor can include program code enabled to resolve an address in a markup defined page to an abstract object hierarchy specifying a hierarchy of dependent abstract and concrete objects for the page. For instance, the address can be a URL. Notably, the abstract object hierarchy can include multiple nodes, where each node is a container which can include a class identifier and an arbitrary number of named properties. Also, the abstract object hierarchy can include links between the nodes defining dependencies between the nodes, wherein a branch of linked nodes define a concrete object. Finally, each node in a branch can define a portion of an address for the concrete object.

In another embodiment of the invention, a method for maintaining object referential integrity for abstract objects can include extracting a reference to an abstract object hierarchy from an address disposed in markup, locating branches of nodes in the abstract object hierarchy which define a concrete object, and translating each located branch of nodes to an address for the concrete object. Notably, extracting a reference to an abstract object hierarchy from an address disposed in markup, can include extracting a reference to an abstract object hierarchy from a URL disposed in a Web page.

Locating branches of nodes in the abstract object hierarchy which define a concrete object can include locating sets of nodes linked together, where each linked together set of nodes defines dependency relationships between the nodes for a concrete object, and where each of the set of nodes defines a branch in the abstract object hierarchy. Also, translating each located branch of nodes to an address for the concrete object, can include translating each located branch of nodes to a URL for the concrete object. Finally, the method can include changing a property of each node in the abstract object hierarchy that matches a specified class identifier.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing object referential integrity for abstract objects. In accordance with an embodiment, a hierarchy can be generated for one or more objects. Each node of the hierarchy can be a container of an arbitrary number of named properties specified by a class identifier and a name for an abstract or concrete portion of an object. Moreover, links between nodes of the hierarchy can indicate dependency relationships among the linked nodes such that a branch of the hierarchy can specify a complete, concrete object. Advantageously, a network address can be extrapolated for the concrete object by combining the names of each node in the branch of the hierarchy. Yet, changes to the objects of the hierarchy can be managed exclusively according to the knowledge of the object relationships apparent from the hierarchy. Consequently, referential integrity can be maintained for the objects of the hierarchy.

Figure 1:
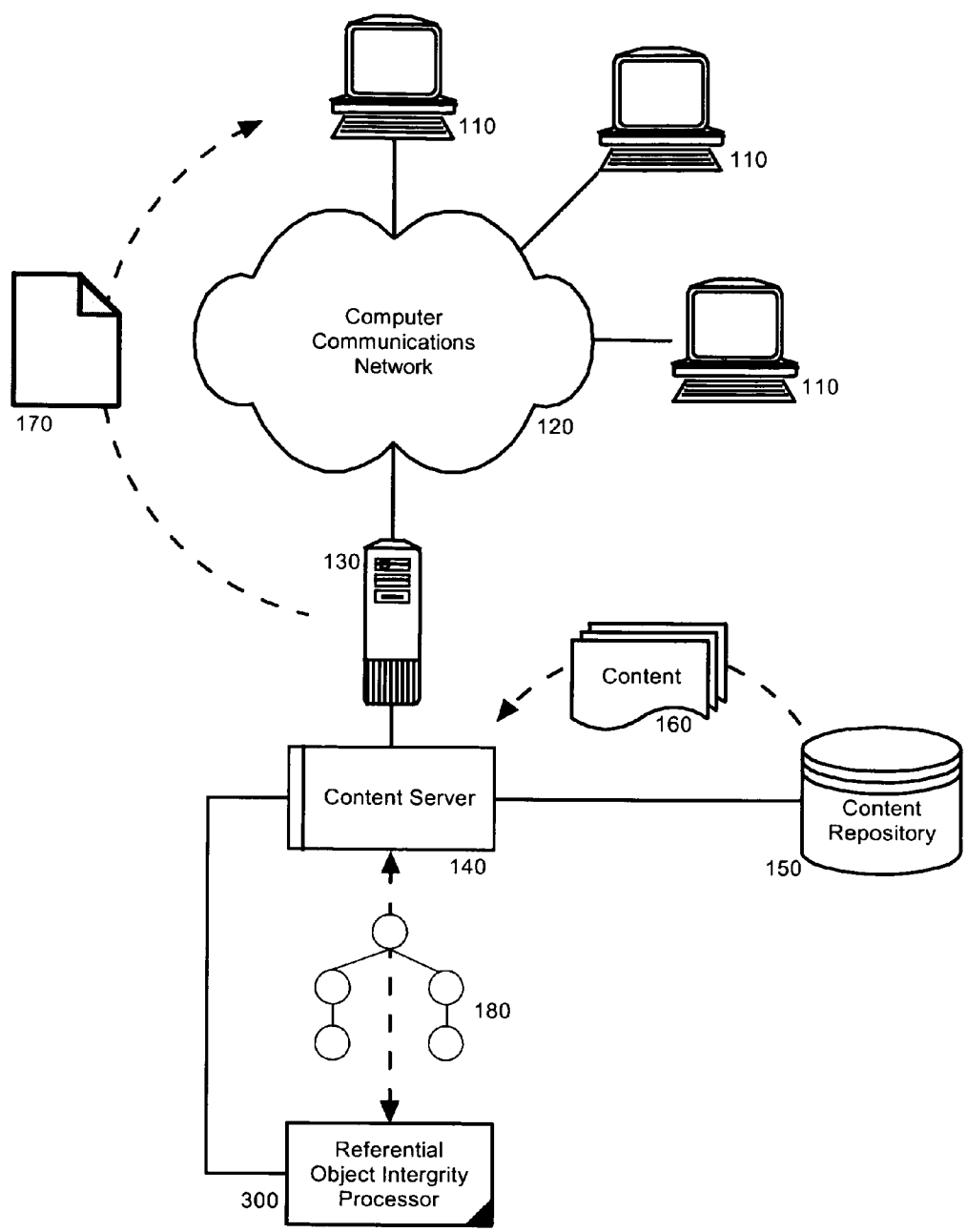
FIG. 1 is a schematic illustration of a data processing system configured to manage referential integrity for abstract objects.

In more particular illustration, FIG. 1 is a schematic illustration of a data processing system configured to manage referential integrity for abstract objects. The data processing system can include a server computing platform 130 coupled to one or more client computing platforms 110 over a computer communications network 120. The server computing platform 130 can host a content server 140. The content server 140 can be coupled to a content repository 140 and configured to retrieve content 160 from the repository 140 for use in serving a requested page 170 to page browsers disposed in corresponding ones of the client computing platforms 110.

Notably, the content 160 can include object references disposed therein. Each object reference can be formulated within the content 160 as a network address such as a URL. The URL can point to an abstract object hierarchy 180. The abstract object hierarchy 180 can include a set of nodes, each node specifying a class identifier and name for an abstract or concrete portion of an object. Links between nodes of the abstract object hierarchy 180 can indicate dependency relationships among the linked nodes such that a branch of the hierarchy can specify a complete, concrete object. Finally, a URL can be extrapolated for the concrete object by combining the names of each node in the branch of the hierarchy.

Figure 2:
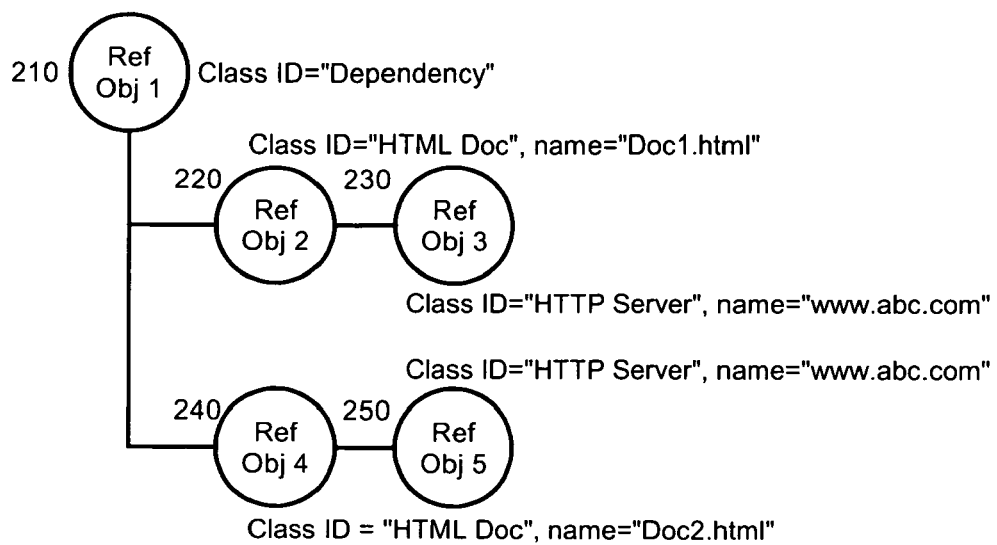
FIG. 2 is block diagram of an abstract object reference configured for use in the data processing system of FIG. 1; and, FIG. 3 is a flow chart illustrating a process for managing object referential integrity in the data processing system of FIG. 1.

In further illustration, referring to FIG. 2, a block diagram is shown of an abstract object hierarchy configured for use in the data processing system of FIG. 1. The abstract object hierarchy can include a root node 210 having a class identifier. The root node can be referenced in a URL. The root node 210 can be linked to dependent nodes 220, 240 which in turn can be linked to further dependent nodes 230, 250. The dependent nodes 220, 240 each can specify an object by name and a class identifier. Similarly, the further dependent nodes 230, 250 each can specify an object by name and class identifier. Notably, the further dependent nodes 230, 250 can be linked to dependent nodes 220, 240, respectively, to indicate a dependent relationship such that a branch of dependent nodes can specify a concrete object. In this way, by combining the names of the branches represented by nodes 220, 230 and nodes 240, 250, a URL can be produced for the objects represented by the branches.

Returning now to FIG. 1, a referential object integrity processor 300 can be coupled to the content server 140 and configured to process the hierarchy 180 to identify the referenced objects for use in the requested page 170. In this regard, the referential object integrity processor 300 can traverse the hierarchy 180 to apply modifications to properties for related objects such as a network location change or file system path change. Specifically, changes to names for a particular class identifier can be applied by the referential object integrity processor 300 by traversing the hierarchy 180 and applying the changes universally to all nodes matching the class identifier.

In consequence of the inventive arrangements shown in FIGS. 1 and 2, changes to portions of an object reference can be applied without regard to the remaining properties of an object reference. Also, additional objects can be inserted into the hierarchy by the referential object integrity processor 300 without requiring the re-specification of the entirety of the hierarchy 180. Likewise, additional properties for an object can be specified for the object by inserting a node into a branch for the object. Accordingly, the abstract object hierarchy can provide a degree of extensibility not apparent from conventional object referential integrity schemes.

Figure 3:
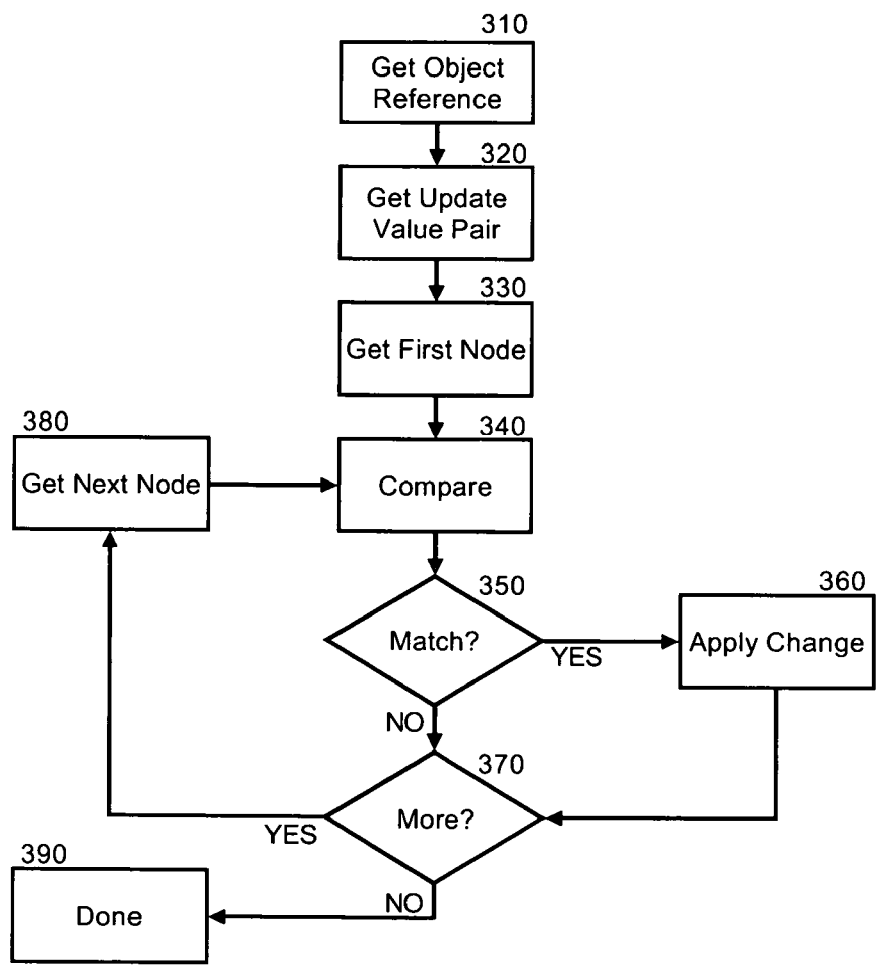

To that end, in illustration of the extensibility of the abstract object hierarchy, FIG. 3 is a flow chart illustrating a process for managing object referential integrity in the data processing system of FIG. 1. Beginning in block 310, an object reference can be obtained and in block 320, an update to a property for the object reference can be determined. In block 330, a first node in the hierarchy can be retrieved and in block 340, the class identifier for the node can be compared to the target class identifier for the update. In decision block 350, if the node is a match, the update can be applied in block 360 to the name property of the node.

Subsequently, if additional nodes remain to be processed in decision block 370, in block 380 a next node in the hierarchy can be retrieved and the process can repeat in blocks 340 through 360. When no further nodes remain to be processed in the hierarchy in decision block 370, in block 390 the process can end. In this way, a single property of an object reference can be updated irrespective of the remainder of the properties associated with the object reference. More specifically, as the nodes in a branch in the hierarchy can be translated into a URL for the object, a change to a portion of the URL can be applied by locating the node corresponding to the portion and applying the change to the property for the located node. Thus, referential integrity for a hierarchy of dependent objects can be maintained despite changes to mere portions of each object reference.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device.

The computer readable storage medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for maintaining object referential integrity for abstract objects, the method executed by a central processing unit (CPU) comprising:
    extracting in a referential object integrity processor executing in memory of a computer, a reference to an abstract object hierarchy from an address disposed in markup;
    locating branches of nodes in the abstract object hierarchy which define a concrete object;
    translating each located branch of nodes to an address for the concrete object; and,
    changing a property of each node in the abstract object hierarchy that matches a specified class identifier.

2. The method of claim 1, wherein extracting a reference to an abstract object hierarchy from an address disposed in markup, comprises extracting a reference to an abstract object hierarchy from a uniform resource locator (URL) disposed in a Web page.

3. The method of claim 2, wherein translating each located branch of nodes to an address for the concrete object, comprises translating each located branch of nodes to a URL for the concrete object.

4. The method of claim 1, wherein locating branches of nodes in the abstract object hierarchy which define a concrete object, comprises locating sets of nodes linked together, each linked together set of nodes defining dependency relationships between the nodes for a concrete object, each of the set of nodes defining a branch in the abstract object hierarchy.

5. A data processing system configured for managing referential integrity for abstract objects, the data processing system comprising:
    a content server stored and executing in memory of a computer and coupled to a content repository and configured to provide requested pages to requesting content browsers over a computer communications network; and,
    a referential object integrity processor coupled to the content server, the referential object integrity processor comprising program code enabled to resolve an address in a markup defined page to an abstract object hierarchy specifying a hierarchy of dependent abstract and concrete objects for the markup defined page,
    wherein the abstract object hierarchy comprises a plurality of nodes, each node specifying a class identifier and a property.

6. The system of claim 5, wherein the address is a uniform resource locator (URL).

7. The system of claim 5, wherein the abstract object hierarchy comprises links between the nodes defining dependencies between the nodes, wherein a branch of linked nodes define a concrete object.

8. The system of claim 7, wherein each node in a branch defines a portion of an address for the concrete object.

9. A computer program product comprising a non-transitory computer usable medium having computer usable program code for maintaining object referential integrity for abstract objects, the computer program product including:
    computer usable program code for extracting a reference to an abstract object hierarchy from an address disposed in markup;
    computer usable program code for locating branches of nodes in the abstract object hierarchy which define a concrete object;
    computer usable program code for translating each located branch of nodes to an address for the concrete object; and,
    computer usable program code for changing a property of each node in the abstract object hierarchy that matches a specified class identifier.

10. The computer program product of claim 9, wherein the computer usable program code for extracting a reference to an abstract object hierarchy from an address disposed in markup, comprises computer usable program code for extracting a reference to an abstract object hierarchy from a uniform resource locator (URL) disposed in a Web page.

11. The computer program product of claim 10, wherein the computer usable program code for translating each located branch of nodes to an address for the concrete object, comprises computer usable program code for translating each located branch of nodes to a URL for the concrete object.

12. The computer program product of claim 9, wherein the computer usable program code for locating branches of nodes in the abstract object hierarchy which define a concrete object, comprises computer usable program code for locating sets of nodes linked together, each linked together set of nodes defining dependency relationships between the nodes for a concrete object, each of the set of nodes defining a branch in the abstract object hierarchy.

* * * * *